(12) United States Patent
Foster et al.

(10) Patent No.: US 7,316,307 B2
(45) Date of Patent: Jan. 8, 2008

(54) RECIPROCATING SLAT CONVEYOR WITH CONTINUOUS SPLASH GUARD BEARINGS

(76) Inventors: Raymond Keith Foster, P.O. Box 1, Madras, OR (US) 97741; Daniel W. Jackson, 4167 SW. Majestic Ave., Redmond, OR (US) 97756; Brian Lance Salyer, 820 NW. 12th St., Bend, OR (US) 97702

( * ) Notice: Subject to any disclaimer, the term of this patent is extended or adjusted under 35 U.S.C. 154(b) by 0 days.

(21) Appl. No.: 11/334,979

(22) Filed: Jan. 18, 2006

(65) Prior Publication Data

US 2007/0170042 A1    Jul. 26, 2007

(51) Int. Cl.
*B65G 25/04* (2006.01)
(52) U.S. Cl. ............... 198/750.2; 198/750.1; 198/750.3; 198/750.4; 414/525.1; 414/525.9
(58) Field of Classification Search ............ 198/750.1, 198/750.2, 750.3, 750.4; 414/525.1, 525.9
See application file for complete search history.

(56) References Cited

U.S. PATENT DOCUMENTS 4,679,686 A * 7/1987 Foster .................... 414/525.1
5,325,957 A * 7/1994 Wilkens ................ 198/750.2
2005/0103600 A1* 5/2005 Wilkens et al. .......... 198/750.1

\* cited by examiner

*Primary Examiner*—Gene O. Crawford
*Assistant Examiner*—Leslie A Nicholson, III
(74) *Attorney, Agent, or Firm*—Delbert J. Barnard

(57) ABSTRACT

An elongated plastic slide bearing (10) comprises a top (30), sidewalls (32, 34) depending from the top (30), and connecting to walls (36, 44, 48 and 38, 46, 50) that form laterally inwardly extending recesses (40, 42). Lock ribs (62, 64) extend upwardly and inwardly from the inner walls (44, 46) of the recesses (40, 42) to upper edges (66, 68). The upper edges (66, 68) are spaced below the bearing top (30). The bearing (10) is adapted to set down onto a support beam (14) that includes laterally outwardly projecting lock flanges (22, 24) at its top. The lock ribs (62, 64) contact the lock flanges (22, 24). When the bearing (10) is pushed downwardly, the lock ribs (62, 64) bend outwardly and allow the lock ribs (62, 64) to move into a position below the lock flanges (22, 24). When that happens, the lock ribs (62, 64) assume substantially unstressed positions in which their upper edges (66, 68) are below the lock flanges (22, 24). The sidewalls (32, 34) and the lock ribs (62, 64) are bendable to allow a floor slat (12) to be snap-fit down onto the bearing (10).

15 Claims, 5 Drawing Sheets

RECIPROCATING SLAT CONVEYOR WITH CONTINUOUS SPLASH GUARD BEARINGS

TECHNICAL FIELD

This invention relates to reciprocating slat conveyors. More particularly, it relates to a system of bearings for the conveyor slats that are adapted to guard against road water splashing upwardly against the under sides of the conveyor slats.

BACKGROUND OF THE INVENTION

A typical arrangement of beams, bearings and slats in a reciprocating slat conveyor is disclosed in U.S. Pat. No. 4,899,870, granted Feb. 13, 1990, to Raymond K. Foster, and entitled Reciprocating Floor Conveyor With Snap-On Floor Members. Longitudinal guide beams that support the bearings are designated 14 in U.S. Pat. No. 4,899,870 (FIG. 1). The bearings are designated 122 in FIGS. 6-8. Special hold-down members are designated 80 (FIGS. 9-13). The bearings 122 are positioned on the guide beams 14 where the guide beams 14 cross over and are secured to transverse frame members 12. In this system, there are longitudinal spaces between the bearings 122 that are open and when the conveyor is used in a truck or trailer, water off the road can and will splash upwardly against the underneath sides of the conveyor slats in the open regions.

There is a need to substantially close the open regions so as to guard against the upward splash of road water against the underneath sides of the conveyor slats. It is a principal object of the present invention to address this need by the use of both old and new technology.

The old technology includes continuing the use of the transverse frame members, the longitudinal guide beams, and conventional conveyor slats. Examples of these components are disclosed in the aforementioned U.S. Pat. No. 4,899,870.

The subject invention is an improvement on the system disclosed by U.S. Pat. No. 5,325,957, granted Jul. 5, 1994, to Arthur Wilkens. U.S. Pat. No. 5,325,957 discloses the use of continuous bearings and states that a function of the bearings is to shield the upper bearing surfaces and the lower slat surfaces from liquids and solid materials splashing up from the road below the conveyor. The bearings disclosed in U.S. Pat. No. 5,325,957 have narrow bases and they are secured to the longitudinal beams by the use of rivets. There is a need for a continuous bearing that will snap down and lock onto the guide beam and which will permit the floor slats to snap down on the bearings. It is an object of the invention to fill this need.

The subject invention takes a different approach to guarding against splash from U.S. Pat. No. 6,889,819 B1, granted May 10, 2005, to Raymond K. Foster, and from European application EP 1 524 212 A1, published Apr. 20, 2005, and filed by Hyva International B.V.

BRIEF SUMMARY OF THE INVENTION

The present invention provides an elongated plastic slide bearing comprising a top, opposite sidewalls that slope downwardly and outwardly from the top to walls forming inwardly extending side recesses. The walls forming the inwardly extending side recesses include inner end boundary walls forming closed inner end boundaries for the side recesses. The walls further form bottom walls projecting laterally outwardly from the inner end boundary wall, below the side recesses and beyond. Lock ribs extend upwardly and inwardly from the inner end boundary walls to upper edges on the lock ribs that are spaced below the top of the bearing and inwardly from the sides of the bearing. The sidewalls are bendably connected to the top and the lock ribs are bendably connected to the inner end boundary walls of the side recesses. In use, each bearing is set down onto a longitudinal support beam that has laterally outwardly projecting top flanges. In preferred form, the slide bearing has a lower space defined laterally between the lock ribs and the inner end boundary walls of the side recesses, and vertically between the upper edges on the lock ribs and the bottom walls of the side recesses. The slide bearings also have an upper space defined vertically between the top of the bearing and the upper edges of the lock ribs and horizontally between the sidewalls above the upper edges of the lock ribs.

According to an aspect of the invention, each slide bearing is adapted to be set down onto a longitudinal support beam that has laterally outwardly projecting top flanges that are positioned in the upper space, and has a lower portion that is positionable in the lower space. The bearing is adapted to be pushed downwardly, causing a contact between the top flanges on the beam and the lock ribs on the bearing that functions to bend the lock ribs outwardly about where they are attached to the bearing, until the upper ends of the lock ribs are moved to a level below the top flanges, at which time the lock ribs will spring inwardly into a set position below the lock flanges. Accordingly, the construction of the bearing allows it to be snap-fitted onto longitudinal guide beams that have laterally outwardly extending top flanges.

According to another aspect of the invention, the bearing is adapted to receive and support an elongated conveyor slat that has a top, opposite sidewalls depending from the top, and bottom flanges extending laterally inwardly from the sidewalls. Inner edge portions of the bottom flanges are set down onto the sloping opposite sidewalls of the bearing. This is followed by a downward push on the slat which causes the bottom flanges on the slat to push inwardly against the sidewalls of the bearing as the slat moves downwardly. The inward force on the sidewalls of the bearing causes the lock ribs to bend where they are connected to the top of the bearing. The bearing is adapted to allow the conveyor slat to move downwardly until the inner ends of the bottom flanges are at the level of the side recesses in the bearing. At that time, the inner edges of the bottom flanges enter into the side recesses and both the lock ribs and the sidewalls spring back substantially into unstressed positions. At that time the upper ends of the lock ribs are below the lock flanges on the guide beams. Any tendency of the bearings to move upwardly is stopped by contact between the upper ends of the lock ribs and the bottom surfaces of the lock flanges. Also, upward movement of the conveyor slat is prevented by contact between the inner edges of the bottom flanges of the conveyor slat and the upper wall of the side recesses.

The longitudinal support beams have lower surfaces that rest on upper surfaces of transverse frame members to which the support beam is attached. The bearing has wing-like side members that extend laterally outwardly from the inner end boundary walls of the recesses, into positions below the side recesses in the bearings.

In preferred form, the bearings extend continuously along the support beams and are either composed of a plurality of segments that substantially contact each other at their ends or are a one-piece member that extends substantially the full length of the support beam.

In a conveyor, the system of bearings guard against splash upwardly against the bottom of the slats except for narrow regions between the slats in which splash is prevented by the lower side surfaces of the slats and by seals that are secured to one side of each slat and make sealing contact with the adjacent side of the adjoining slat.

Other objects, advantages and features of the invention will become apparent from the description of the best mode set forth below, from the drawings, from the claims, and from the principles that are embodied in this specific structures that are illustrated and described herein.

BRIEF DESCRIPTION OF THE SEVERAL VIEWS OF THE DRAWINGS

Like reference numerals are used to designate like parts throughout the several views of the drawing, and.

DETAILED DESCRIPTION OF THE INVENTION

Figure 1:
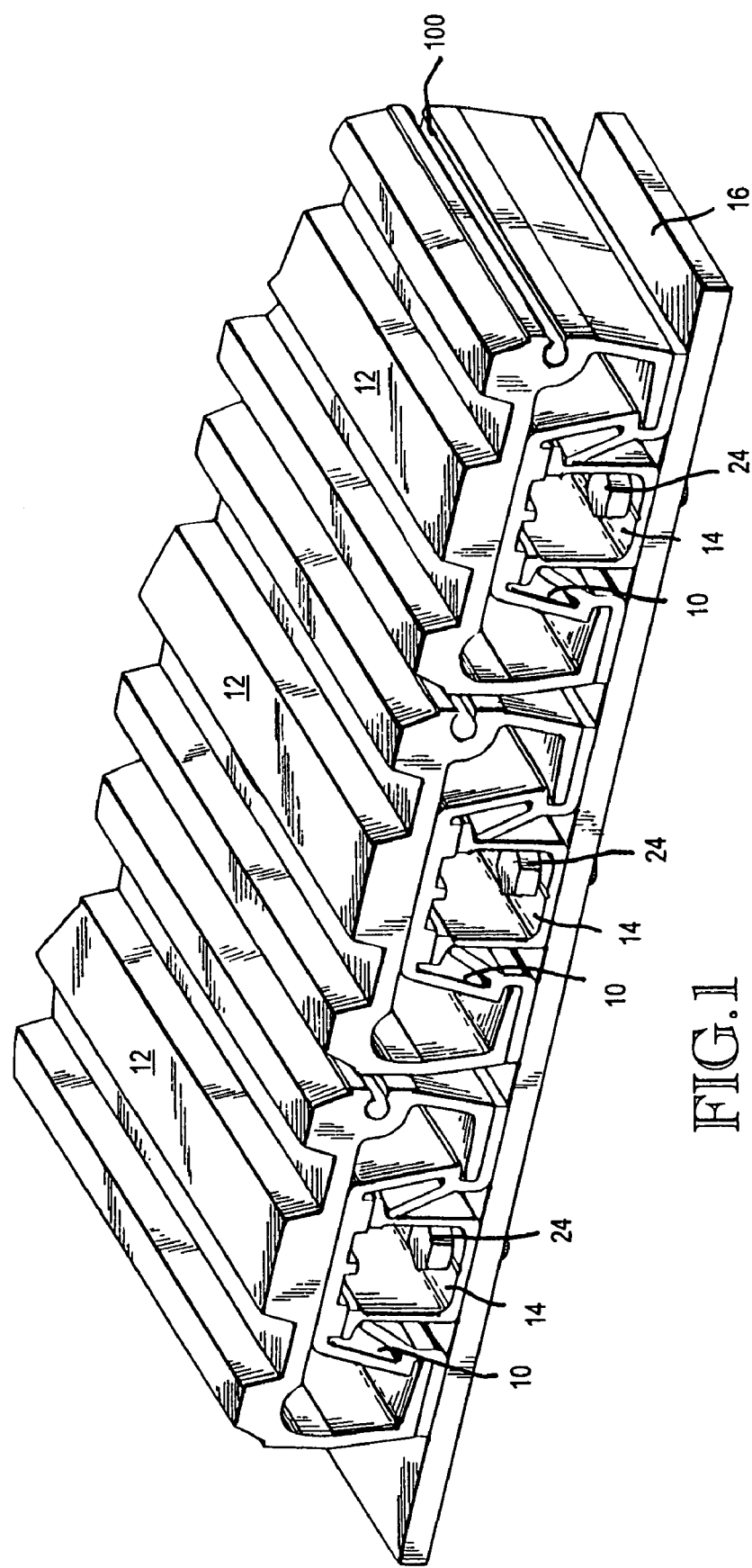
FIG. 1 is a fragmentary pictorial view of a section of a reciprocating slat conveyor, taken from above and looking towards the top, one end and one side of the pictured conveyor components.
Figure 2:
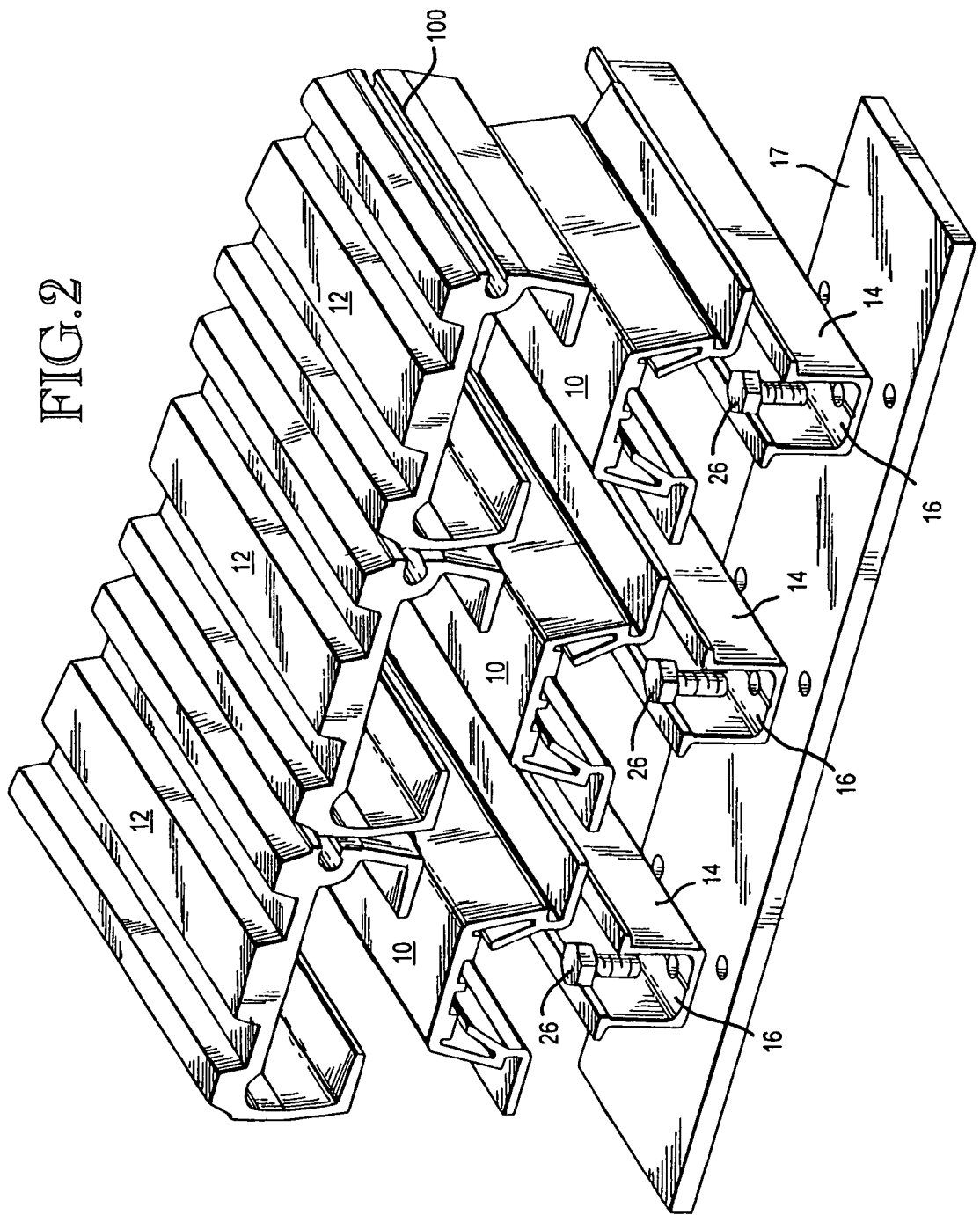
FIG. 2 is an exploded pictorial view of the components shown by FIG. 1.

The bearing 10 is preferably as long as the support beam 14 on which it is retained. FIGS. 1 and 2 show slide bearings 10 for slidably mounting conveyors slats 12 relative to longitudinal support beams 14. FIG. 1 shows the bearings 10 positioned on the support beams 14 and the slats 12 positioned on the bearings 10. FIG. 2 shows the bearings 10 spaced above the support beams 14 and the conveyor slats 12 positioned above the bearings 10. FIGS. 1 and 2 also show a transverse frame member 16 that extends below and perpendicular to the support beams 14.

Support beam 14 preferably comprises opposite sidewalls 18, 20 extending upwardly from the bottom wall 16, and outwardly projecting lock flanges 22, 24 on top of the sidewalls 18, 20. In this embodiment bolts or rivets 26 extend through the bottom wall 16 and the transverse frame members 28.

Bearing 10 includes a top 30 that sets down on top of the lock flanges 22, 24. Bearing 10 also includes opposite sidewalls 32, 34 that slope outwardly and downwardly from their connection with the top 30 to lower edges 36, 38 which form roofs for a pair of side recesses 40, 42. Walls at the bottoms of the sidewalls 32, 34 form the side recesses 40, 42, including inner edge boundary walls 44, 46. The walls that form the side recesses 40, 42 also form wing-like flanges 44, 46 that extend laterally outwardly from the inner boundary walls 44, 46, below the recesses. The flanges 48, 50 extend below bottom flanges 52, 54 of floor slats 12. The floor slats 12 include tops 56, sidewalls 58, 60 and the bottom flanges 48, 50.

The conveyor slats 12, the support beams 14 and the bearings 10 preferably all extend the full length of the conveyor. Preferably, the bearings 10 are one-piece members but they could also be made in segments that when installed form a substantially continuous bearing. The ends of the segments would substantially meet so that there is very little space between them through which moisture could splash up through.

The bearings 10 include lock ribs 62, 64 which extend upwardly and inwardly from the end walls 44, 46. Lock ribs 62, 64 terminate in upper edges 66, 68. The edges 66, 68 are spaced vertically below the top 30 of the bearing 10. Edges 66, 68 are also spaced laterally inwardly of the sidewalls 32, 34. A first or upper space is formed vertically between edges 66, 68 and bearing top 30, and laterally between bearing sidewalls 32, 34 above the lock ribs 62, 64. A lower space is formed vertically below the upper edges 66, 68 and horizontally between the lock ribs 62, 64 and the end walls 22, 24.

Figure 3:
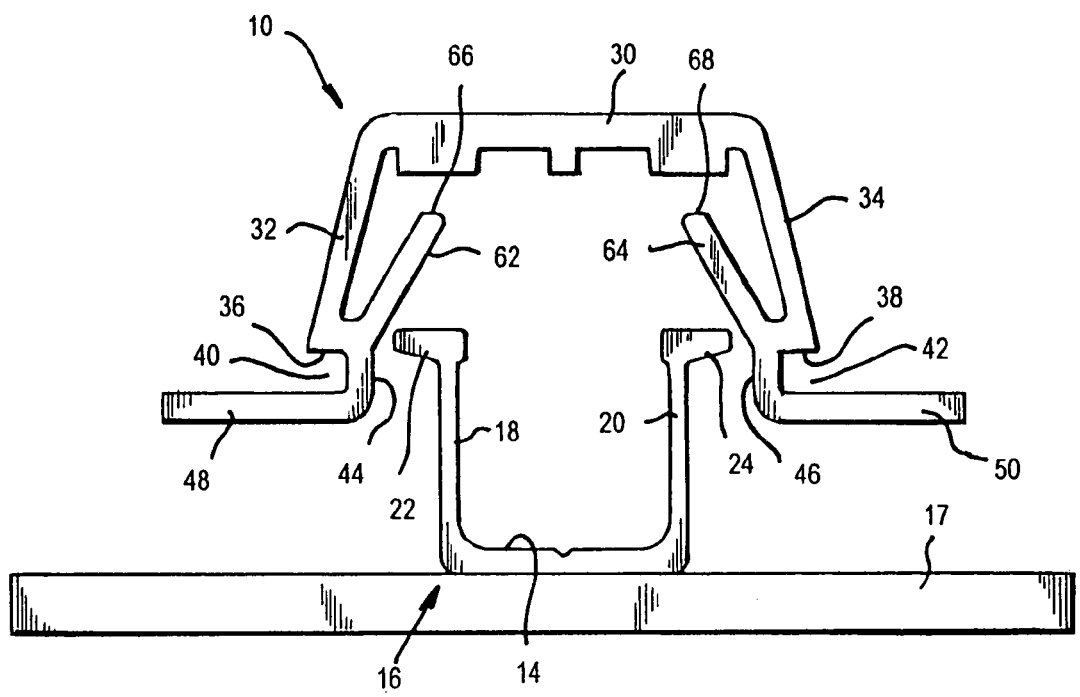
FIG. 3 is an end view of a bearing embodying the present invention, positioned above a longitudinal support beam, immediately prior to being set down onto the support beam.
Figure 4:
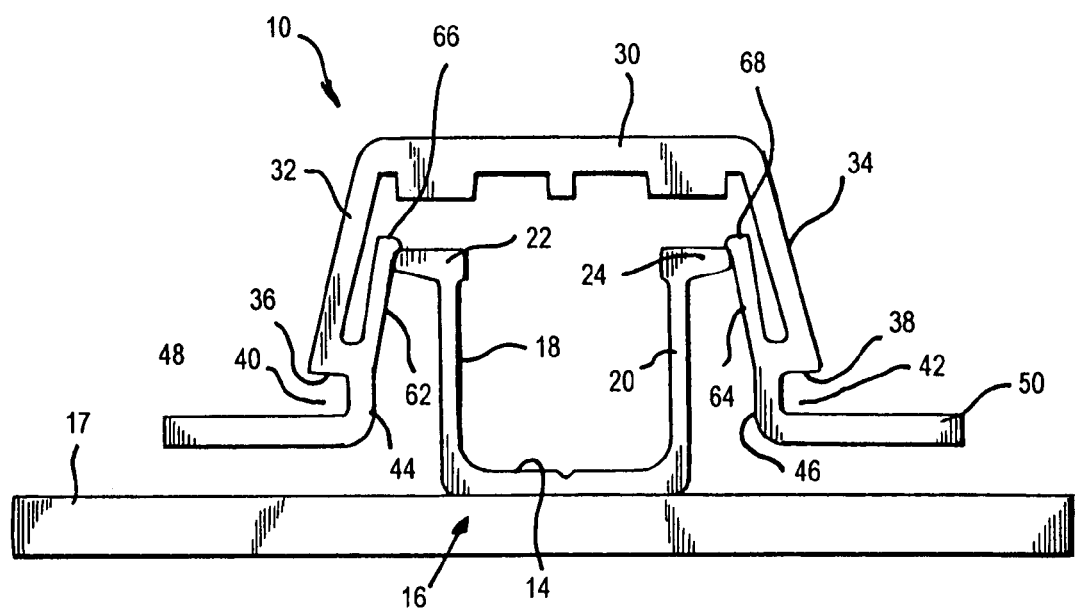
FIG. 4 is a view like FIG. 3, but showing the bearing pushed part way down onto the support beam, and showing lock ribs in the process of being spread apart so that they will move passed lock flanges on the support beam.
Figure 5:
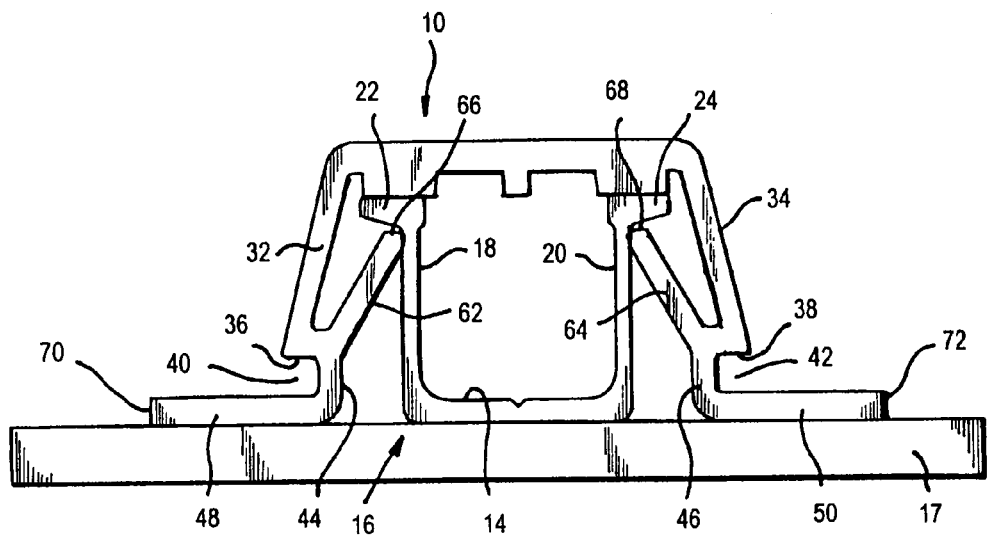
FIG. 5 is a view like FIGS. 3 and 4, but showing the bearing pushed down into a position wherein the lock ribs on the bearing are below lock flanges on the support beam.

FIG. 3 shows the static condition of the bearing 10. In this condition, the sidewalls 32, 34 slope downwardly and outwardly and the lock ribs 62, 64 slope upwardly and inwardly. The installation of the bearing 10 on the support beam 14 commences with the step of positioning the bearing 10 above the support beam 14, as shown in FIG. 3. Then, the bearing 10 is moved downwardly to place the inner surfaces of the lock recesses 62, 64 against the outer edges of the lock flanges 22, 24. Then, the bearing 10 is pushed downwardly. As shown by FIG. 4, the interference between the flanges 22, 24 and the lock recesses 62, 64, causes the lock recesses to bend about their connections to the walls 22, 24 and swing outwardly, so that the flanges 22, 24 can pass relative between them. Eventually, the upper edges 66, 68 are moved below the lock flanges 22, 24. When this happens, the lock recesses 62, 64 swing inwardly into the positions shown by FIG. 5 and the top 30 of the bearing 10 comes to rest on top of the lock flanges 22, 24. As shown by FIG. 5, the lock flanges 62, 64 move inwardly against the sidewalls 18, 20 and their upper edges 66, 68 are positioned below the lock flanges 22, 24. As can easily be seen, the lock flanges 22, 24 prevent upward movement of the bearing 10 off of the beam 14.

The bottom of beam wall 14 lays flat on the top of transverse frame member 16. As previously stated, the bearing 10 is a continuous bearing (one piece or segmented). As a result, the bearing wings 48, 50 bridge across the tops of the transverse frame members 16. The bearing 10 makes a footprint that is as long as the beam 14 and as wide as the distance between the side edges 70, 72 of the wings 48, 50.

Figure 6:
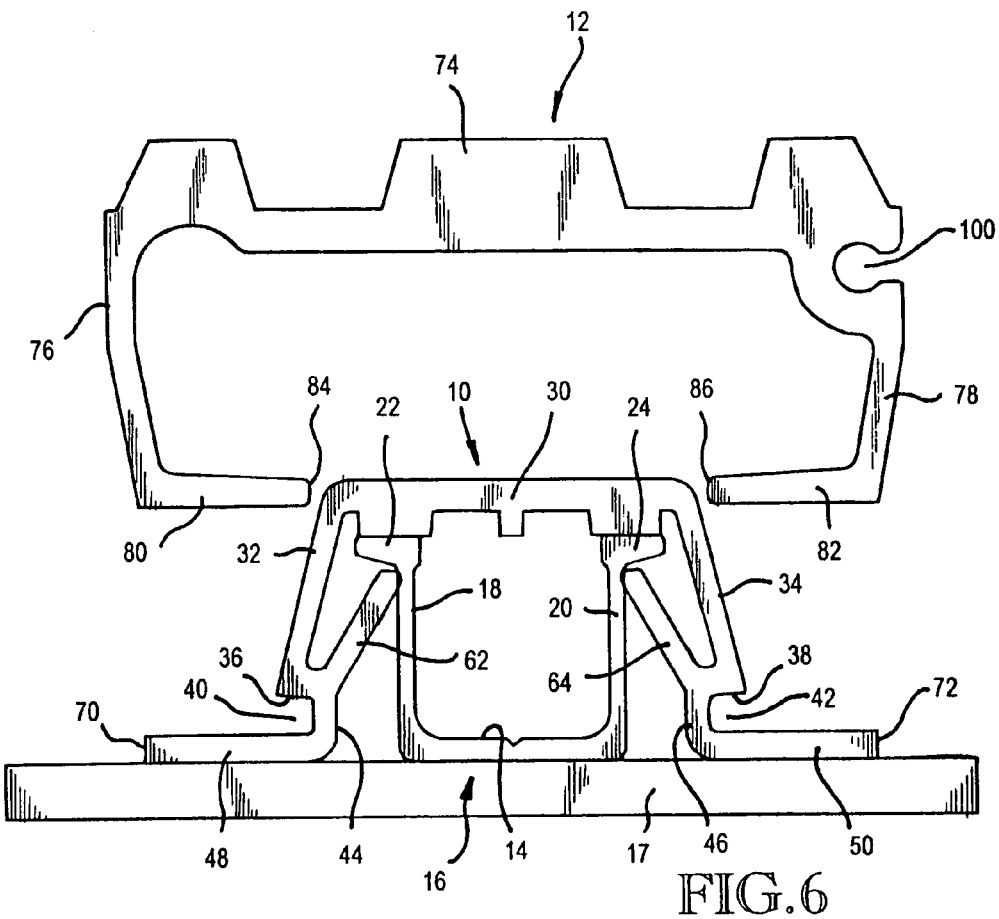
FIG. 6 is a view like FIG. 5 showing a conveyor slat positioned above the bearing and ready to be moved downwardly onto the bearing.
Figure 7:
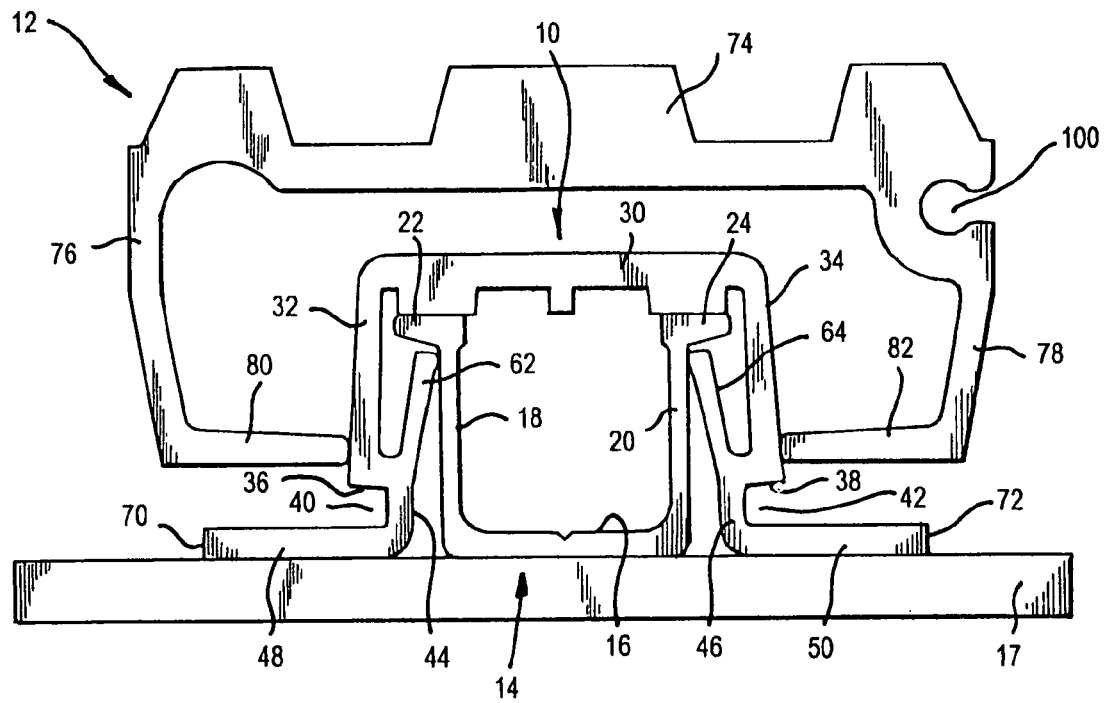
FIG. 7 is a view like FIG. 6, but showing the conveyor slat being pushed downwardly to cause the lock ribs and the sidewalls of the bearing to bend so that bottom flanges on the slat can move into side recesses at the bottom of the bearing.
Figure 8:
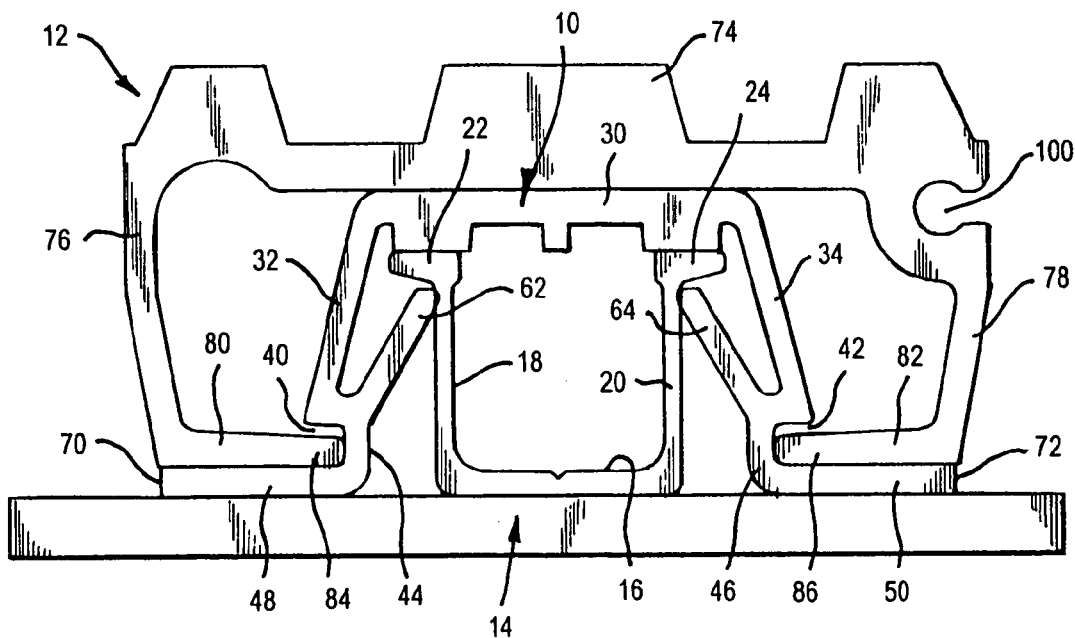
FIG. 8 is a view like FIGS. 6 and 7, but showing the conveyor slat moved downwardly until its top rests on the top of the bearing and the bottom flanges on the slat are within the side recesses and rest on wings that are on the bearing below and laterally outwardly beyond the side recesses.

Referring to FIG. 6, the floor slats 12 each comprises a top 74, a pair of sidewalls 76, 78 that extend downwardly from the top 74, and a pair of bottom flanges 80, 82 that extend laterally inwardly from the sidewalls 76, 78. The bottom flanges 80, 82 confront each other and are in co-planar parallelism. The lateral distance between their inner edges 84, 86 is wider than the width of the bearing top 30 and narrower than the width of the bearing measured between the bottoms of the sidewalls 32, 34. The floor slat is installed by positioning it above its bearing 10, with the edges 84, 86 positioned to contact the bearing sidewalls 32, 34 when the floor slat 12 is moved downwardly. As shown by FIG. 7, as the floor slat 12 is moved downwardly, the edges 84, 86 of the bottom flanges 80, 82 contact the bearing sidewalls 32, 34, pressing inwardly on them. This causes the lock ribs 62, 64 to bend where they are connected to the recess walls 44, 46, and swing outwardly away from each other. The force of the bottom flanges 80, 82 acting on the bearing sidewalls 32, 34 causes the bearing sidewalls 32, 34 to bend where they are attached to the bearing top 30, causing the bearing sidewalls 32, 34 to swing inwardly, as shown by FIG. 7. Eventually, the inner edges 84, 86 of the bottom flanges 80, 82 will move passed the lower edges 36, 38 of the sidewalls 32, 34, and into the side recesses 40, 42. When the inner edges 84, 86 of the bottom flanges 80, 82 are in the side recesses 40, 42, the bearing sidewalls 32, 34 will swing outwardly to their unstressed positions and the lock recesses 62, 64 will also swing back to substantially unstressed positions. This is shown by FIG. 8. At this time, the top 74 of the slat 12 rests on the top 30 of the bearing 10 and the bottom flanges 80, 82 rest on the wings 48, 50. As previously stated, the bearing 10 is locked onto the beam 16 by the interference between the lock ribs 62, 64 and the lock flanges 22, 24. Also, the conveyor slat 12 is prevented against upward movement off of the bearing by interfering between the tops of the recesses 42 and the inner edges 84, 86 of the bottom flanges 80, 82.

The elongated plastic slide bearing 10 is an unique article of manufacture. Its structural features includes its top 30, sidewalls 32, 34, recess forming walls 36, 44, 48 and 38, 46, 50 and the lock ribs 62, 64. All of these parts are "adapted" to allow the bearing to be snapped down onto a longitudinal guide beam that includes laterally outwardly projecting lock flanges 22, 24. The construction also allows the floor slat 12 to be snapped down onto the installed bearing 10. As previously stated, each bearing 10 may be a single continuous member that extends the full length of the support beam 14. Or, the bearing for each slat may be constructed from closely spaced segments having the cross section shown in the drawings. This segmented construction is another way of forming a substantially continuous bearing for each conveyor slat 12.

The conveyor slats 12 comprise longitudinal seal-receiving recesses 100, adapted to receive any one of the large number of available seal strips. Example seal strips are shown in U.S. Pat. No. 5,655,645, granted Aug. 12, 1997, to Raymond Keith Foster.

The illustrated embodiments are only examples of the present invention and, therefore, are non-limitive. It is to be understood that many changes in the particular structure, materials and features of the invention may be made without departing from the spirit and scope of the invention. Therefore, it is our intention that the patent rights not be limited to the particular embodiments that are illustrated and described herein, but rather are to be determined by the following claims, interpreted according to accepted doctrines of patent claim interpretation, including use of the doctrine of equivalents and reversal of parts.

What is claimed is:

1. An elongated plastic slide bearing, comprising:
    a top having opposite side edges, said top extending continuously from each side edge to the other side edge;
    opposite sidewalls sloping downwardly and outwardly from the opposite side edges of the top to walls forming inwardly extending side recesses;
    said walls forming the inwardly extending side recesses including inner end walls forming closed inner end boundaries for the side recesses, and bottom walls projecting laterally outwardly from the inner end walls, below the side recesses and beyond;
    lock ribs extending upwardly and inwardly from the closed inner end boundary walls of the side recesses to upper edges on the lock ribs that are spaced below the top of the bearing laterally inwardly from the sidewalls of the bearing;
    wherein a space is formed above each recess by and between the sidewall and the lock rib;
    wherein the sidewalls are bendably connected to the top and the lock ribs are bendably connected to the closed inner end walls of the side recesses; and
    a lower spaced defined laterally between the lock ribs and the closed inner end walls of the side recesses, and vertically between the upper edges on the lock ribs and the bottom walls of the side recesses, and an upper space defined vertically between the top of the bearing and the upper edges of the lock ribs and horizontally between the sidewalls above the upper edges of the lock ribs.

2. The slide bearing of claim 1, adapted to set down onto a longitudinal support beam that has laterally outwardly projecting top flanges positionable in said upper space, and has a lower portion positionable in said lower space.

3. The slide bearing of claim 2, adapted to be set down onto the longitudinal support beam, with its lock ribs in contact with the top flanges on the beam, and be pushed downwardly to move the lock ribs past the top flanges into positions below the top flanges.

4. The slide bearing of claim 3, adapted to receive and support an elongated conveyor slat that has a top, opposite sidewalls depending from the top, and bottom flanges extending laterally inwardly from the sidewalls, and being adapted to receive inner edge portions of the bottom flanges of the slat in said recesses.

5. The slide bearing of claim 1, wherein the bottom walls of the side recesses include bottom surfaces that form lower boundaries of the bearing.

6. The slide bearing of claim 5, adapted to sit down onto a longitudinal support beam and transverse frame members below the longitudinal support beam, and said bottom walls of the side recesses being adapted to sit down onto upper surfaces of the transverse frame members.

7. A reciprocating slat conveyor, comprising:
    a longitudinal support beam;
    at least one plastic slide bearing on the support beam;
    an elongated conveyor slat on the bearing;
    said longitudinal support beam having a top, opposite sidewalls and laterally outwardly projecting flanges on each side of the longitudinal beam;
    said bearing having a one piece top that rests on the top of the longitudinal beam and has opposite side edges, and downwardly and outwardly sloping sidewalls that extend downwardly from the side edges of the top of the bearing to walls forming laterally outwardly opening side recesses, said walls including recess top walls which extend laterally inwardly from and below the sidewalls;
    lock ribs on each side of the bearing that slope upwardly and inwardly from the recess top walls to upper edges on the lock ribs;
    said lock ribs being entirely above the side recesses;
    said bearing being adapted to be set down onto the top of the longitudinal beam, and be pushed downwardly so that the outwardly projecting flanges on the support beams will bend the lock ribs outwardly until the upper edges of the lock ribs are below the lock flanges;

said elongated conveyor slat having a top, opposite sides depending from the top, and inwardly projecting bottom flanges at the bottoms of the sidewalls, said bottom flanges having inner ends; and said conveyor slats being adapted to be set down onto the bearings with the inner edges of the bottom flanges on the slats in contact with the sidewalls of the bearing, and be pushed down to cause the lock ribs to bend and allow the bottom flanges of the conveyor slats to spring the sidewalls of the bearing inwardly until the inner edges of the bottom flanges are in the side recesses.

8. The reciprocating slat conveyor of claim 7, said conveyor further comprising transverse frame members below the longitudinal support beam, wherein the bearings include bottom walls which form bottoms for the recesses and include bottom surfaces that rest on the transverse frame members.

9. The reciprocating slat conveyor of claim 8, wherein the bearing extends lengthwise of the longitudinal support beam at least across two transverse frame members.

10. The reciprocating slat conveyor of claim 9, wherein the bearing is a one-piece continuous member.

11. The reciprocating slat conveyor of claim 8, wherein the longitudinal support beam has a closed bottom and is open at its top between sidewalls.

12. The reciprocating slat conveyor of claim 11, comprising a plurality of longitudinally spaced apart transverse frame members below the longitudinal support beams and below the bearing, and said bottom of the longitudinal support beam being connected to such frame members.

13. The reciprocating slat conveyor of claim 12, wherein bottom of said support beam sits down onto upper surfaces of the transverse support members.

14. The reciprocating slat conveyor of claim 13, wherein the bearing extends substantially the full length of the longitudinal support beam.

15. The reciprocating slat conveyor of claim 14, wherein the bearing is a one-piece continuous member.

* * * * *